(12) United States Patent
Howe et al.

(10) Patent No.: US 8,858,889 B2
(45) Date of Patent: Oct. 14, 2014

(54) CONTAMINATE CONTROL DEVICE

(75) Inventors: Robert H. Howe, West Suffield, CT (US); Kenneth P. Flynn, Enfield, CT (US); Thomas J. Stapleton, Southwick, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 414 days.

(21) Appl. No.: 13/083,649

(22) Filed: Apr. 11, 2011

(65) Prior Publication Data
US 2012/0258014 A1 Oct. 11, 2012

(51) Int. Cl.
*A62B 7/08* (2006.01)
*B01J 7/00* (2006.01)
*B01D 59/50* (2006.01)

(52) U.S. Cl.
USPC ............... 422/122; 422/239; 55/482; 55/484

(58) Field of Classification Search
USPC .............................. 422/122, 239; 55/482, 484
See application file for complete search history.

(56) References Cited

U.S. PATENT DOCUMENTS

| 4,662,352 | A | * | 5/1987 | Aviles, Jr. ..................... 126/204 |
| 5,431,706 | A | * | 7/1995 | Paas ................................. 55/342 |
| 6,610,122 | B1 | | 8/2003 | Filburn et al. |
| 7,563,390 | B2 | * | 7/2009 | Holladay et al. .............. 252/373 |
| 7,637,988 | B2 | | 12/2009 | Dean, II |
| 7,736,416 | B2 | | 6/2010 | Nalette et al. |
| 8,043,572 | B2 | * | 10/2011 | Cheng ........................... 422/171 |
| 2005/0284118 | A1 | | 12/2005 | Nishiyama et al. |
| 2010/0216628 | A1 | | 8/2010 | Vanderspurt et al. |
| 2011/0100388 | A1 | * | 5/2011 | Li et al. ........................ 131/340 |

FOREIGN PATENT DOCUMENTS

| DE | 3632405 | 4/1987 |
| DE | 3805361 | 9/1988 |
| DE | 202006002508 | 8/2007 |
| DE | 102007062098 | 6/2009 |
| WO | 2006088475 | 8/2006 |

OTHER PUBLICATIONS

Extended European Search Report mailed Jul. 16, 2012 for European Application Serial No. 12154976.0-1213; Date of Completion Jul. 6, 2012.

* cited by examiner

*Primary Examiner* — Christopher K Vandeusen
(74) *Attorney, Agent, or Firm* — Cantor Colburn LLP

(57) ABSTRACT

A contaminate control device for filtering contaminates from a gas such as air is provided. The device includes a housing having a first inlet and a first outlet. An axial flow filter is fluidly coupled between the first inlet and the first outlet, the axial flow filter has a second inlet and a second outlet. A second filter disposed about the axial flow filter and is fluidly coupled between the first inlet and the first outlet, the second filter having a third inlet on an inner diameter and a third outlet disposed on an outer diameter. A flow restrictor is fluidly coupled between the second inlet and the first inlet.

19 Claims, 7 Drawing Sheets

CONTAMINATE CONTROL DEVICE

STATEMENT OF GOVERNMENT INTEREST

This invention was made with government support under Contract Number NNJ06TA25C, subcontract number RH6-118203 awarded by the National Aeronautics and Space Administration (NASA). The government may have certain rights in the invention.

BACKGROUND OF THE INVENTION

The subject matter disclosed herein relates to a device for filtering a gas and in particular to a device that removes trace contaminants from a gas stream in a pressurized and vacuum environment.

Vehicles such as high altitude, suborbital or spacecraft vehicles utilize air filtration systems to recycle air for use by the vehicles occupants. Typically, the filtration is accomplished using a catalytic reaction of contaminants in one device and an absorption reaction in second device. Each device uses a container that holds media particles. These devices may be arranged in parallel with a single air flow being split into two air streams. Each device has an air flow operating parameter under which it operates to remove the desired contamination. In a typical filtration system, one device processes a larger volume of air than the other device. Since the separate air streams are recombined before being returned for use within the vehicle, additional hardware and components are utilized to equalize the pressure drop of the air streams as they flow through the filtration devices.

These filtration systems operate in a demanding environment that varies from atmospheric pressure to the vacuum of space. A typical filtration system media is not intended to be used in a vacuum environment. Therefore the filtration devices are arranged within vessels with increased wall thicknesses that add weight to the vehicle. Further, the media may be regularly replaced during maintenance operations so the vessels will have joints that need to be sealed. Due to the increased potential for a leakage of one of these seals, spacecraft usually transport additional make up gas that may be used to compensate for any leakage. It should be appreciated that the need for bringing make up gas increases the weight of the air filtration system and decreases available space for payload.

Accordingly, while existing vehicle air filtration systems are suitable for their intended purposes the need for improvement remains, particularly in providing a filtration device that reduces the complexity of installation and also the size and weight of the air filtration system.

BRIEF DESCRIPTION OF THE INVENTION

According to one aspect of the invention, a contaminate control device is provided. The contaminate control device having a housing with a first inlet and a first outlet. An axial flow filter is fluidly coupled between the first inlet and the first outlet, the axial flow filter having a second inlet and a second outlet. A radial flow filter is disposed about the axial flow filter and is fluidly coupled between the first inlet and the first outlet, the radial flow filter having a third inlet on an inner diameter and a third outlet disposed on an outer diameter. A flow restrictor is fluidly coupled between the second inlet and the first inlet.

According to another aspect of the invention, another contaminate control device is provided. The contaminate control device having a housing with a inlet on a first end and an opening on a second end. A first cover is sealingly coupled to the opening, the first cover and the housing cooperating to define an interior volume, the first cover having an outlet. A filter member is disposed within the interior volume and is fluidly coupled between the inlet and the outlet. The filter member having a cylindrical filter portion and a tubular filter portion at least partially disposed about the cylindrical filter portion. The filter member further having a flow restrictor disposed between the cylindrical filter portion and the inlet.

According to yet another aspect of the invention, yet another contaminate control device is provided. The contaminate control device includes a pressure vessel having a closed first end and an open second end, the first end having a wall having an inlet and a first chamber. A first cover is removably and sealably coupled to the second end, the first cover having an outlet. The pressure vessel and the first cover are arranged to cooperate in defining an interior volume. A member is removably coupled within the interior volume. The member comprises a first filter having a housing and a perforated inlet end and a perforated outlet end. The first filter having a catalyst disposed therein, wherein the perforated inlet end is fluidly coupled to the first chamber and the perforated outlet end is fluidly coupled to the outlet. The member also has a flow restrictor disposed in the housing adjacent the perforated inlet end. A second filter is provided having an inner diameter and an outer diameter, the second filter being disposed at least partially around the first filter. A first channel is defined by the housing and the inner diameter, the first channel being fluidly coupled to the inlet. A second channel is defined by the pressure vessel and the outer diameter, the second channel being fluidly coupled to the outlet.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Air filtration systems are utilized in high altitude, suborbital and space vehicles to remove contaminants from a supply of air to allow extended operations when the external environment does not provide a fresh supply of air. Embodiments of the present invention provide a contaminant control device that may be used in a vehicle, such as a spacecraft, aircraft, submarines and nuclear-biological-contamination (NBC) vehicles for example, to remove trace contaminants from a gas stream. Embodiments of the present invention reduce the weight and space utilized by a contaminant control device. Embodiments of the present invention provide for the balancing of the pressure drop across different filtration media. Embodiments of the invention provide for a pressure vessel that reduces the number of joints and seals that are maintained to reduce the potential for leakage.

It should be appreciated that while embodiments described herein may refer to a gas stream being filters as being "air", the gas stream may be any suitable human-breathable gas such as an oxygen-enriched gas for example. Further, as used herein, the term "filter" means any device that increases the purity of the air, either by entrapping the contaminant within the media or by converting the contaminant with a catalyst. Therefore, the filter may be a particulate removal device, a catalytic chemical reactor, a chemical sorbent device or an ion exchange device.

Figure 1:
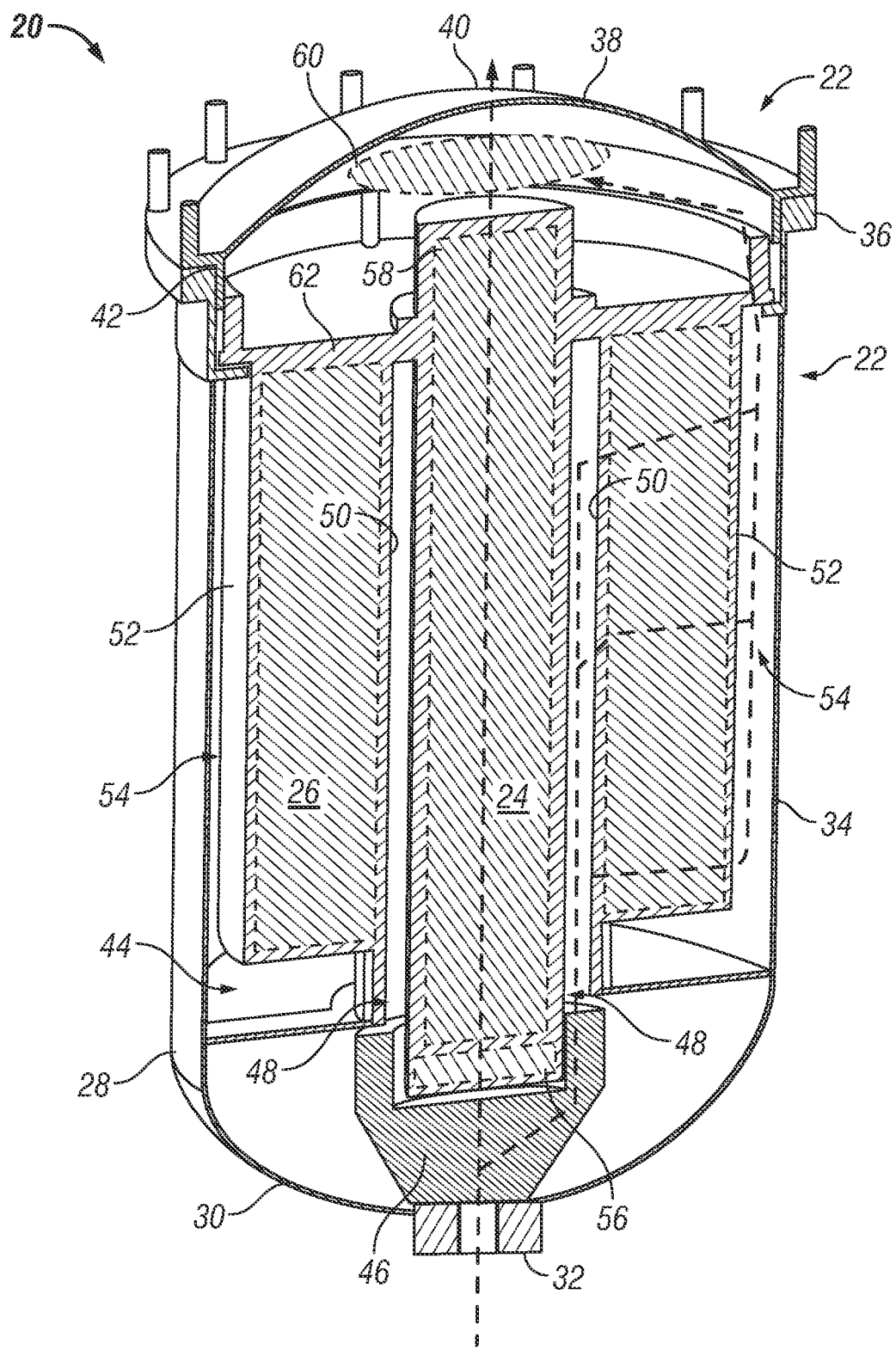
FIG. 1 is a perspective view partially in section of a filtration device in accordance with an embodiment of the invention.
Figure 2:
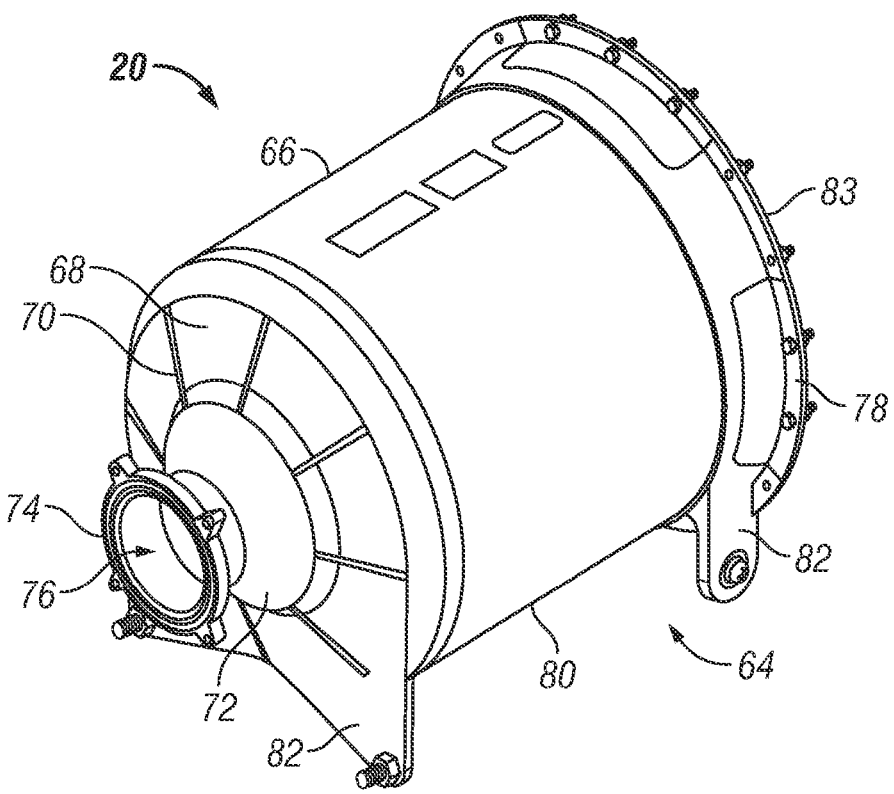
FIG. 2 is a first perspective view of a filtration device in accordance with another embodiment of the invention
Figure 3:
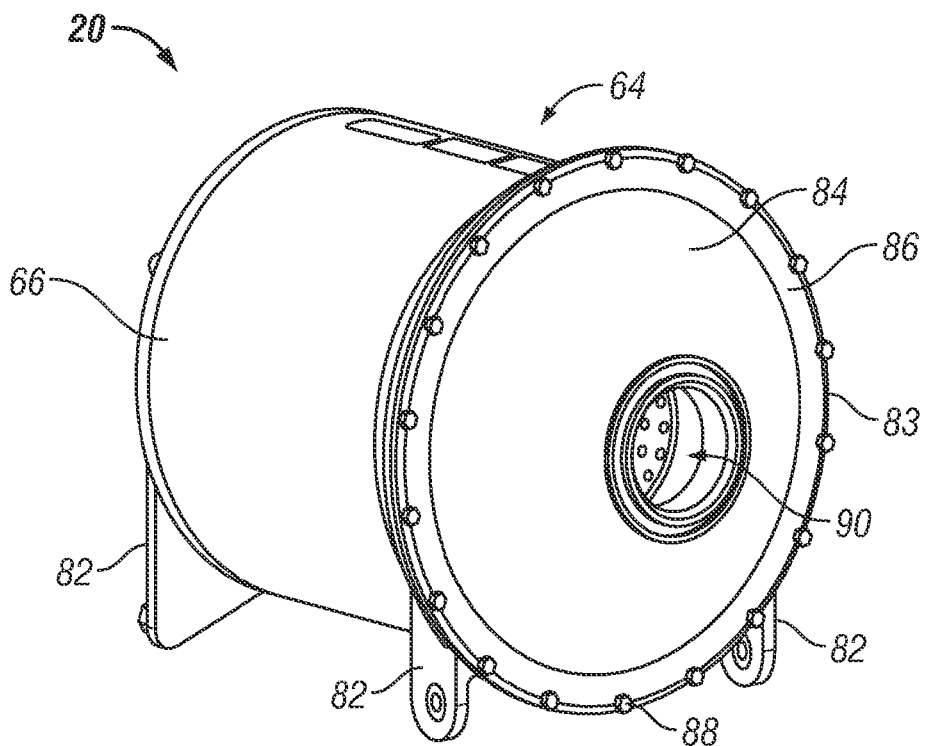
FIG. 3 is a reverse perspective view of the filtration device of FIG. 2.

An exemplary embodiment of a contaminant control device 20 is shown in FIG. 1 that includes a single housing 22 that acts as a pressure vessel to contain a first filter media 24 and a second filter media 26. The housing 22 is a pressure vessel that includes a body portion 28 and a cover 38. The body portion 28 has a semispherical end 30 with an inlet 32. A cylindrical wall 34 extends from the semispherical end 30 and terminates at an open end having a flange 36. Coupled to the flange 36 is a semispherical cover 38 having an outlet 40. A seal 42 is arranged between the cover 38 and the flange 36. The cover 38 and body portion 28 cooperate to define an interior volume 44 that contains the media 24, 26.

Adjacent the inlet 32 is a chamber 46 that bifurcates the incoming air steam. A portion of the air stream enters a cylindrical channel 48. In the exemplary embodiment, the channel 48 is disposed about the first filter media 24. The channel 48 directs the air stream to a perforated inner diameter wall 50 of a housing for the second filter media 26. The air stream flows radially through the second filter media 26 and exits via a perforated outer diameter wall 52 into a second channel 54. The outer wall 52 and an interior surface of the cylindrical wall 34 define the second channel 54. In the exemplary embodiment the second filter media 26 is a charcoal absorption media.

The second portion of the incoming air stream is directed from the chamber 46 through a flow restrictor 56 into the first filter media 24. The second air steam flows axially through the first filter media 24 to an outlet end 58. In the exemplary embodiment, the flow restrictor 56 is comprised of at least one disk made from a porous or woven material, such as a felt disk or a screen for example. The flow restrictor 56 is disposed at the entrance to the first filter media 24. In one embodiment, the contaminant control device 20 is calibrated during assembly by increasing or decreasing the number of felt disks in the flow restrictor 56 to ensure a substantially equal pressure drop between the air stream flowing through the filter media 24, 26. The felt disk may have a thickness of up to 0.080 inches (2.032 millimeters) to provide incremental adjustments in the pressure drop. In the exemplary embodiment, the first filter media 24 includes an ambient temperature catalytic oxidizer (ATCO) catalyst.

The air streams from the outlet end 58 and the second channel 54 converge in a chamber 60. In one embodiment, the chamber 60 is defined by wall or media cover 62 and the cover 38. The chamber 60 allows the two air streams to recombine prior to exiting the contaminant control device 20 via the outlet 40.

Referring now to FIGS. 2-9, another embodiment is shown of a contaminant control device 20. In this embodiment, the contaminant control device 20 includes a housing 64 having a body portion 66 and a cover 83. In the exemplary embodiment, the body portion 66 and cover 83 are made from aluminum. The body portion 66 includes an inlet end 68 that may include one or more ribs 70. A semispherical projection 72 extends from the end 68 and terminates in a flange 74. In one embodiment, the flange 74 provides for a bolted and sealed connection with the inlet conduit (not shown) of an air filtration system. An inlet 76 extends into the body portion 68 as will be discussed in more detail below. The body portion 66 includes a flange 78 at an opposite end with a cylindrical wall 80 disposed therebetween. The body portion 66 may include one or more mounting brackets 82 that allow the contaminant control device 20 to be secured within the vehicle.

The cover 83 includes a semispherical portion 84 and a generally planar outer diameter portion 86. The outer diameter portion 86 includes a plurality of holes that are sized to receive fasteners 88 that couple the cover 83 to the flange 78. An outlet 90 is arranged centrally on the semispherical portion 84. As will be discussed in more detail below, the outlet 90 extends into an interior volume of the housing 64. The outlet 90 is configured to sealingly couple with a discharge conduit (not shown) that routes the filtered air stream for further use or processing.

Figure 4:
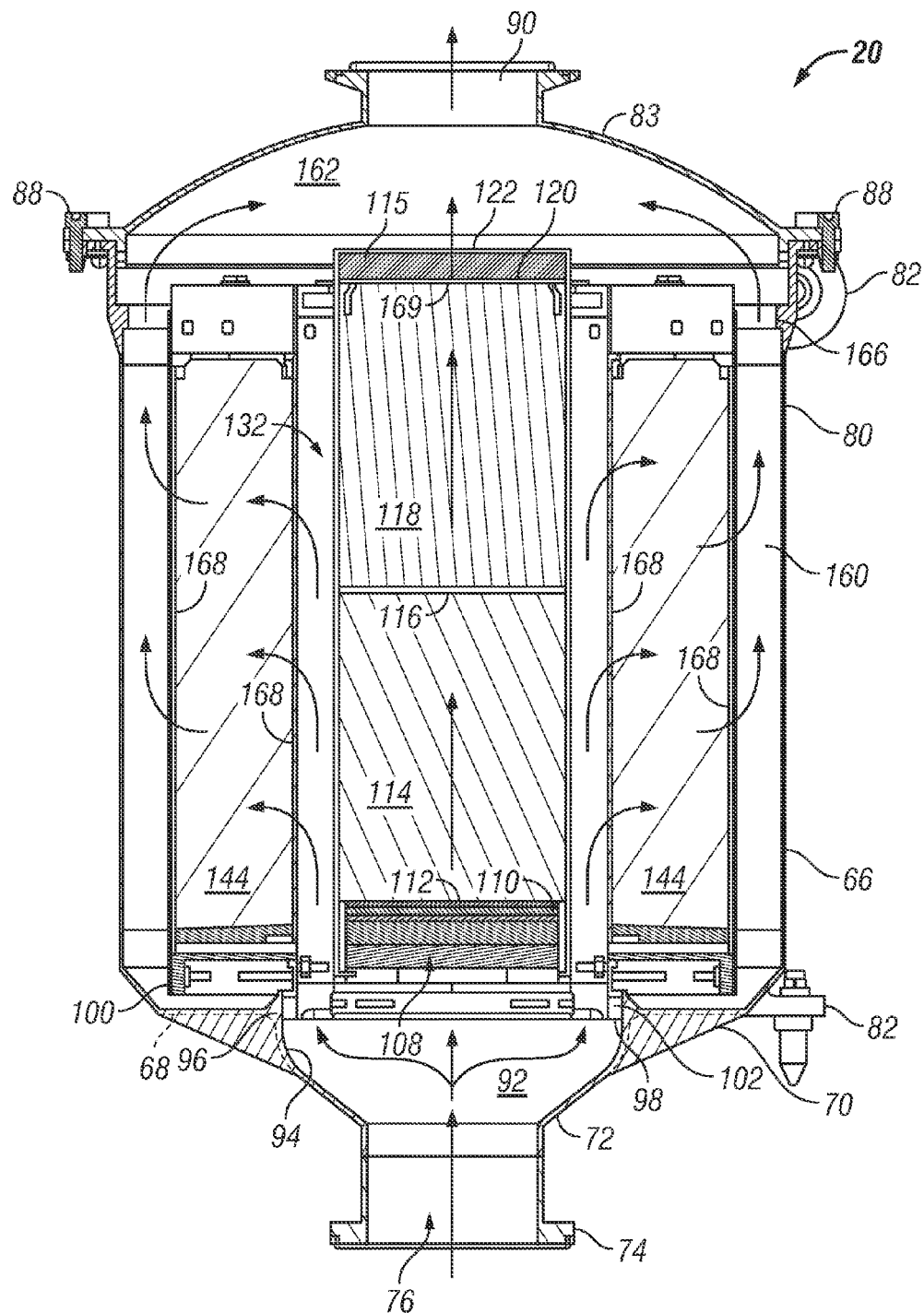
FIG. 4 is a side sectional view of the filtration device of FIG. 2.
Figure 5:
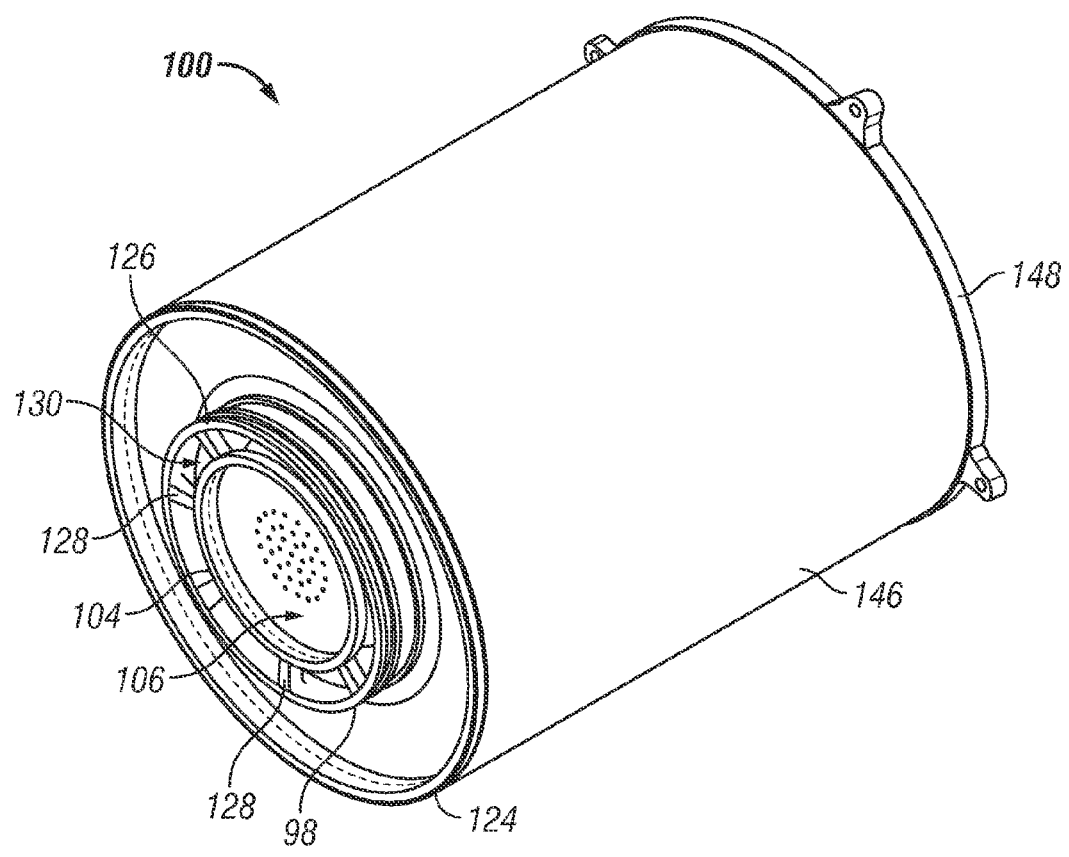
FIG. 5 is a perspective view of a media canister assembly for the filtration device of FIG. 2.
Figure 6:
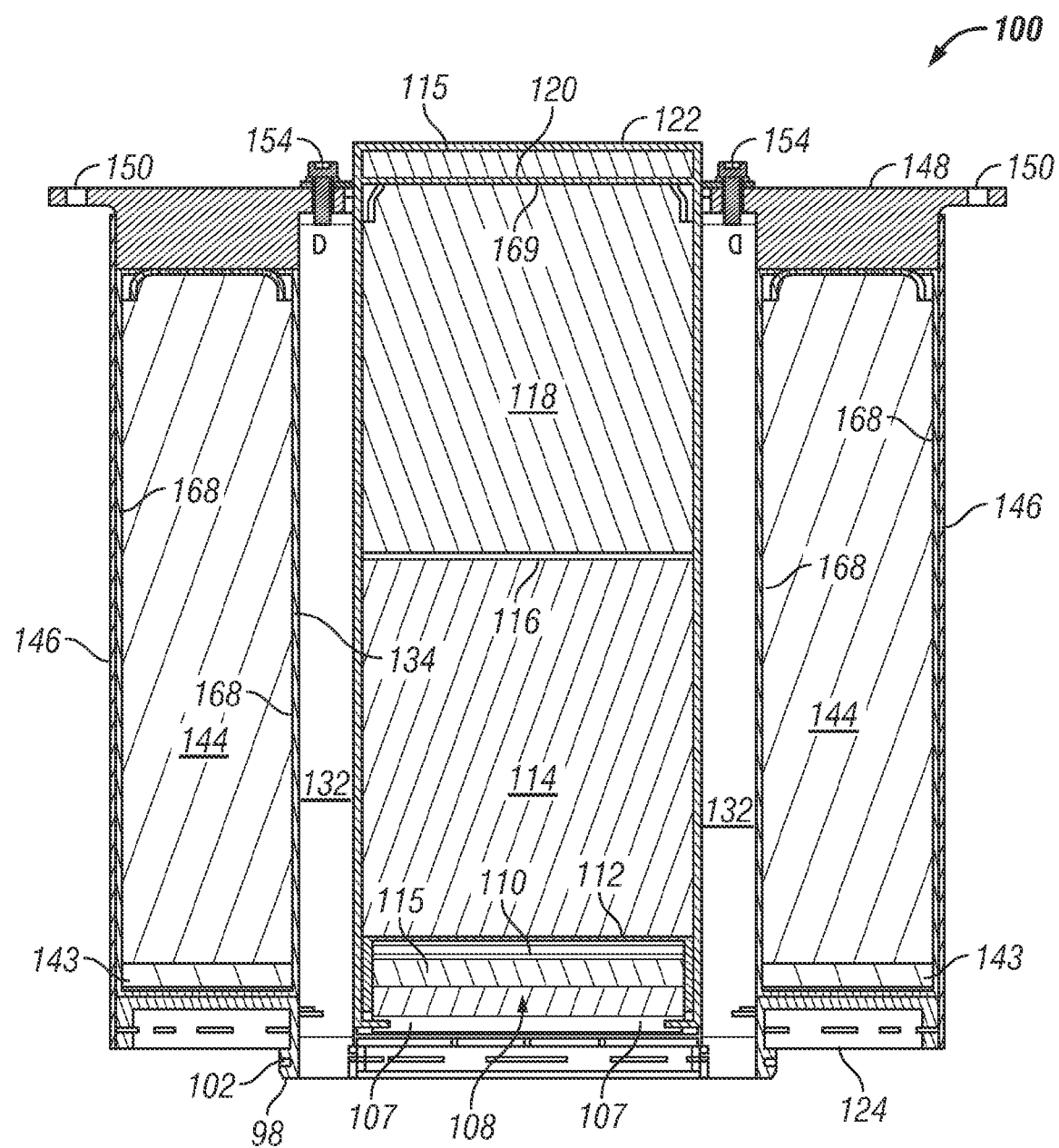
FIG. 6 is a side sectional view of the media canister assembly of FIG. 5.
Figure 7:
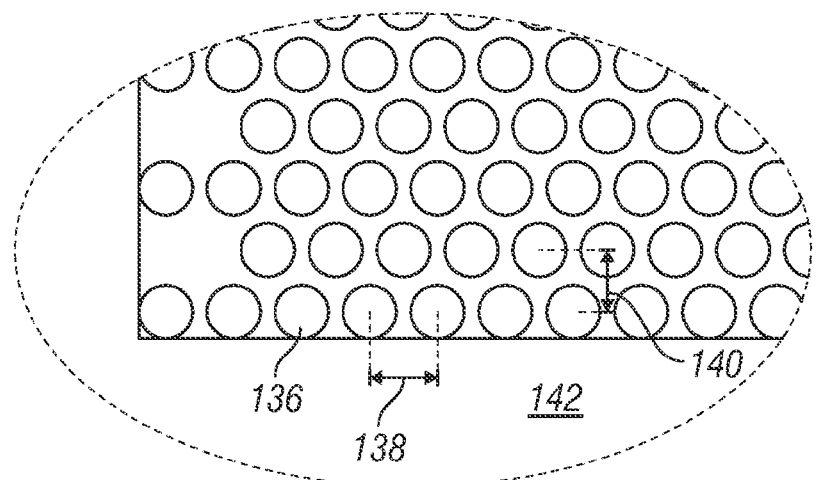
FIG. 7 is a side view of a perforated wall for use with a radial flow filter in the media canister assembly of FIG. 6.
Figure 8:
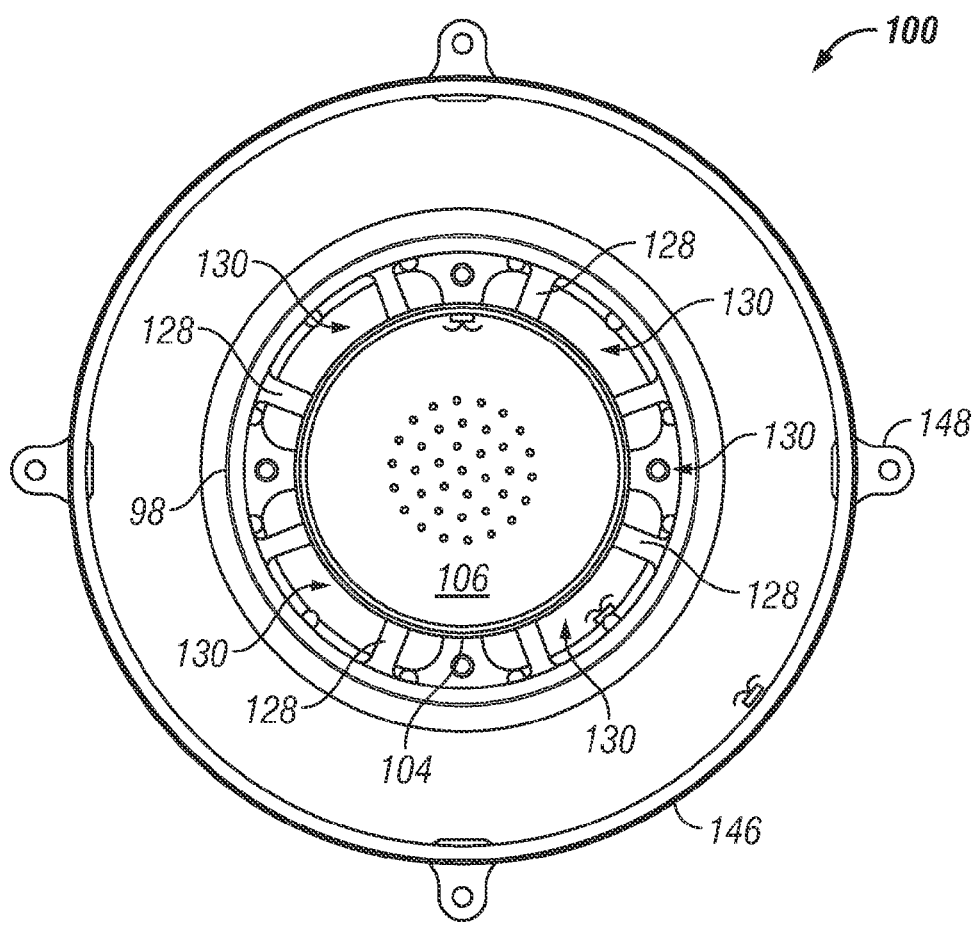
FIG. 8 is an inlet end view partially in section of the media canister of FIG. 5; and, FIG. 9 is an outlet end view of the filtration device of FIG. 3 with a top cover removed.
Figure 9:
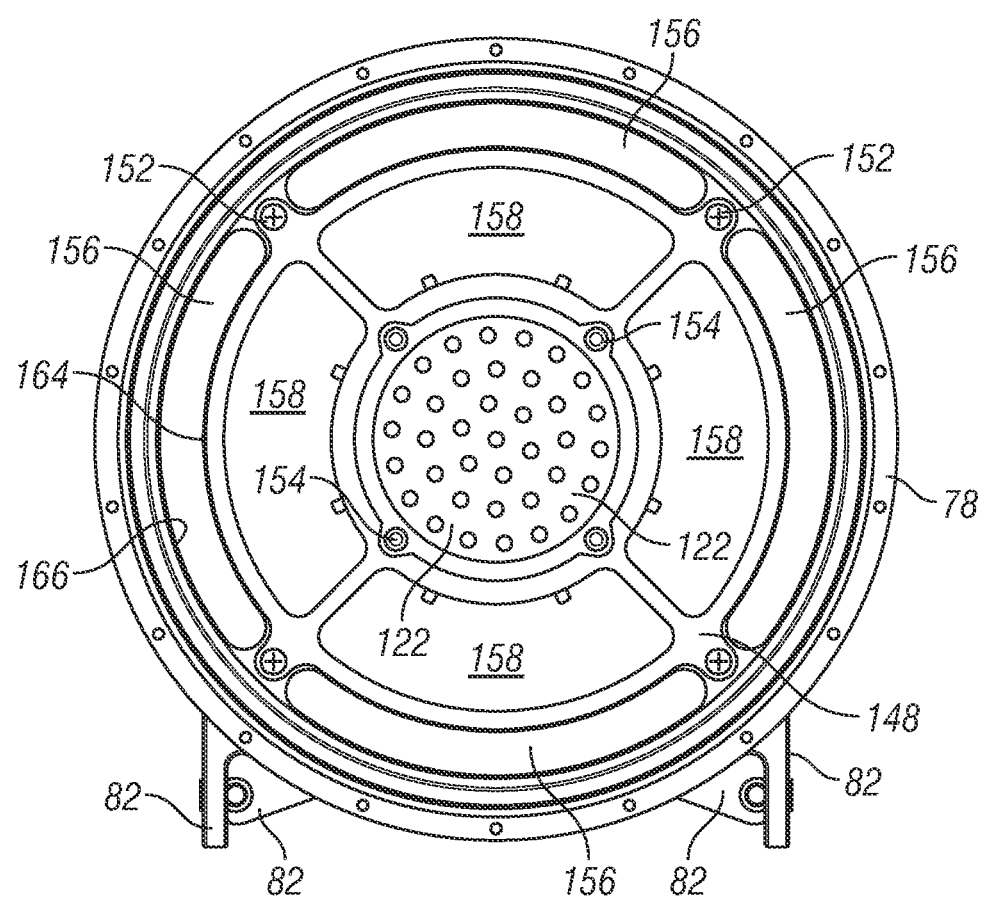

The inlet 76 extends towards the interior volume of the housing 64 and into a bell-shaped chamber 92 (FIG. 4). In one embodiment, the chamber 92 is defined within a wall 94 of the end 68. The wall 94 may include a lip 96 having a diameter sized to receive a rim 98 of a filter media canister 100. A seal 102 may be disposed between the rim 98 and the lip 96 to prevent air from leaking into channel 160.

The filter media canister 100 is removably coupled within the housing 64. The media canister 100 includes a first filter cartridge 104 having a perforated inlet 106 that provides a substantially uniform flow of gas into the interior of the first filter cartridge 104. Adjacent the inlet 106 is a preload pad 107 and a flow restrictor 108. The preload pad 107 may be made from a closed-cell silicone material for example. The preload pad 107 applies a desired level of pressure on the media bed to maintain the media bed at a desired density under a variety of conditions, such as under the vibrations experienced during a vehicle launch. The preload provided by the preload pad 107 further assists in preventing channeling of the media bed particles. The flow restrictor 108 may be any suitable member that provides a desired pressure drop, such as but not limited to felt disks or screens for example. In the exemplary embodiment, the flow restrictor 108 may include at least one felt disk 110. The felt disk 110 allows for a substantially uniform distribution of the gas.

In one embodiment, the flow restrictor 108 is configured as a cartridge 112 having additional components such as a felt cup, screen and a rigid porous disk 115. The porous rigid disk 115 transfers the preload from the preload pad 107 substantially uniformly to the media bed material and also provides substantially free flow of gas to the media bed. The porous rigid disk 115 may be made from an expanded aluminum foam for example. Adjacent the flow restrictor 108 is a first media bed 114. In the exemplary embodiment, the first media bed 114 is made from a charcoal absorption media. A screen 116 is arranged on one end of the first media bed 114 and separates the first media bed 114 from a second media bed 118. In one embodiment, the second media bed 118 includes ambient temperature catalytic oxidizer (ATCO) catalyst. Opposite the screen 116, the first filter cartridge 104 has a screen 120, porous rigid disk 115 and a perforated outlet 122. In the exemplary embodiment, the media beds 114, 118 are disposed within a filter bag 169, such as one made out of felt for example, that holds the media particles within the first filter cartridge 104. The filter bag 169 assists in preventing media particle dust from entering the outlet stream.

Disposed about the first filter cartridge 104 is a second filter cartridge 124 having a generally tubular shape. The second filter cartridge 124 includes a projection 126 having the rim 98. As discussed above, the rim 98 engages the lip 96 to secure the end of the media canister 100 within the housing 64 and provide a seal. The rim 98 includes a plurality of projections 128 that extend radially inward from the rim 98. The projections 128 secure the end of the first filter canister 104 and also define a plurality of inlet openings 130. The inlet openings 130 fluidly couple the chamber 92 to a cylindrical channel 132. In one embodiment, the projections 128 position the first filter cartridge 104 coaxially within the interior diameter of the second filter cartridge 124.

The channel 132 is defined between the outer diameter of the first filter cartridge 104 and the inner diameter wall 134 of the second filter cartridge 124. In one embodiment, the wall 134 is perforated having holes 136 (FIG. 7) with a diameter of 0.063 inches (1.6 millimeters). In one embodiment, the holes 136 are spaced apart a first distance 138 of 0.080 inches (2.032 millimeters) and a second distance 140 of 0.069 inches (1.753 millimeters). In one embodiment, the wall includes an area 142 arranged about the periphery that does not have any holes 136. The perforations allow an air stream entering the channel 132 to flow into a media bed 144 containing a charcoal absorption media. The outer diameter of the second filter cartridge 124 includes a perforated wall 146 that allows the air stream to exit the media bed 144. The wall 146 may include holes sized and positioned substantially similar to those described for the wall 134. In the exemplary embodiment, the media bed 144 is disposed within a filter bag 168, such as one made out of felt for example, that holds the media particles within the second filter cartridge 124. The felt bag 168 assists in preventing media particle dust from entering the outlet stream.

On one end of the second filter cartridge 124 is a preload member 143. The preload member 143 applies a pressure on the media bed particles to assist in maintaining the desired density under a variety of operating conditions, such as the vibrations associated with vehicle launches for example. In the exemplary embodiment, the preload member 143 is made from a closed cell silicone pad. At an opposite end of the second filter cartridge 124 is a cover 148. The cover 148 may include one or more holes 150 that receive fasteners 152 (FIG. 9) to couple the filter media canister 100 to the body portion 66. Fasteners 154 extend through the cover 148 to couple the first media cartridge 104 to the cover 148. The cover 148 may include one or more cavities 158 to reduce weight. The cover 148 further includes an outside contour 164 that cooperates with an inside contour 166 of the flange 78 to define one or more semiannular slots 156. The slots 156 connect with a channel 160 defined between the wall 146 and in the inner diameter of the body portion 66. The channel 160 directs the air stream exiting the media bed 144 through the slots 156.

In one embodiment, the cover 83 and cover 148 cooperate to define a chamber 162. The chamber 162 receives air streams exiting the perforated outlet 122 and the slots 156 allowing the air filtered through the different media beds 114, 118, 144 to be recombined. The combined air streams exit the chamber 162 via outlet 90.

During operation, the air stream is received via inlet 76 and enters the chamber 92 where the air stream bifurcates. A first air stream enters the first filter cartridge via the perforated inlet 106. A second air stream enters the channel 132 via the openings 130. In the exemplary embodiment, the flow rate of the second air stream is approximately four times that of the first air stream. The first air stream passes through the flow restrictor and axially into the first media bed 114. The axial flow continues through the second media bed 118 before exiting via outlet 122. The second air stream passes into the channel 132 and flows through the perforations in wall 134 and is directed radially through the media bed 144. The second air stream exits the media bed at perforated wall 146 and flows through the slots 156 via the channel 160. The first air stream and second air stream recombine in the chamber 162 and exit via the outlet 90.

It should be appreciated that the contaminant control device provides both the absorption and catalytic reaction filtration to occur within a single pressure vessel having only one sealed joint. The contaminant control device further integrates a flow control within the housing that allows for calibration of the air flow distribution between the media beds 114, 118 and the media bed 144. These features provide advantages in that the number of interconnecting ducts and tubes are reduced and the input and distribution plenums may be shared. Further advantages are proved in that the support structure, such as mounting brackets may be reduced. These features provide advantages in reducing both the size and weight of the contaminant control device while also increasing its reliability.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A contaminate control device comprising:
   a housing having an inlet and an outlet, the housing having an axis;
   an axial flow filter fluidly disposed coaxially within the housing and coupled between the first inlet and the first outlet, the axial flow filter having an inlet and an outlet, wherein the axial flow filter is configured to flow a first gas portion through a first filter media in an axial direction parallel to the axis and directly between the inlet of the housing and the outlet of the housing;
   a radial flow filter disposed circumferentially about the axial flow filter and fluidly coupled between the inlet of the housing and the outlet of the housing, the radial flow filter having an inlet on an inner diameter and an outlet disposed on an outer diameter, wherein the radial flow filter is configured to flow a second gas portion through a second filter media in a radial direction directly between the inlet of the radial flow filter and the outlet of the radial flow filter while the first gas portion is flowing through the axial flow filter; and,
   a flow restrictor fluidly coupled between the inlet of the axial flow filter and the inlet of the housing;

wherein the flow restrictor is sized to provide a first pressure drop between the flow restrictor and the inlet of the axial flow filter that is substantially equal to a second pressure drop between the inlet of the radial flow filter and the outlet of the radial flow filter for a predetermined flow rate through the axial flow filter and radial flow filter.

2. The device of claim 1 wherein the flow restrictor includes at least one felt disk.

3. The device of claim 1 further comprising a chamber fluidly coupled between the outlet of the housing, the outlet of the axial flow filter, and the outlet of the radial flow filter.

4. The device of claim 3 further comprising a first channel disposed between the radial flow filter inner diameter and the axial flow filter, the first channel having an inlet on one end and a closed opposite end.

5. The device of claim 4 wherein the housing includes:
   a body having a semispherical wall on one end and a cylindrical wall extending from the semispherical wall, the semispherical wall and the cylindrical wall defining an interior volume, wherein the inlet of the housing is arranged in the semispherical wall and the axial flow filter and the radial flow filter are disposed within the interior volume;
   a cover sealably coupled to the cylindrical wall, the cover cooperating with the axial flow filter and the radial flow filter to define the chamber; and,
   a second channel fluidly coupled between the outlet of the radical flow filter and the chamber, wherein the second channel is adjacent the cylindrical wall.

6. A contaminate control device comprising:
   a housing having an inlet on a first end and an opening on a second end, the housing having an axis;
   a first cover sealingly coupled to the opening, the first cover and the housing cooperating to define an interior volume, the first cover having an outlet; and,
   a filter member disposed coaxially within the interior volume and fluidly coupled between the inlet and the outlet, the filter member having a cylindrical filter portion arranged to receive gas directly from the inlet of the housing and a tubular filter portion at least partially disposed about the cylindrical filter portion, the tubular filter portion arranged to receive a gas from the inlet of the housing and filter a radial flow, the filter member having a flow restrictor disposed between the cylindrical filter portion and the inlet of the housing, wherein the cylindrical filter portion has an inlet and outlet and is configured to flow a first gas portion through a first filter media parallel with the axis directly between the first end and the second end of the housing, and the tubular portion has an inlet and an outlet and is configured to flow a second gas portion through a second filter media in a radial direction while the first gas portion is flowing through the axial flow filter;
wherein the flow restrictor is sized to provide a first pressure drop between the flow restrictor and the outlet of the cylindrical filter portion that is substantially equal to a second pressure drop between the inlet of the tubular filter portion and the outlet of the tubular filter portion for a predetermined flow rate through the cylindrical filter portion and the tubular filter portion.

7. The device of claim 6 wherein the first filter media includes an ambient temperature catalytic oxidizer (ATCO) catalyst arranged in series with a first charcoal material.

8. The device of claim 7 wherein the second filter media includes a second charcoal material.

9. The device of claim 8 wherein the tubular filter portion includes a perforated inner diameter wall and a perforated outer diameter wall.

10. The device of claim 9 wherein the filter member further comprises:
    a first channel fluidly coupled between the inlet of the housing and the perforated inner diameter wall, the first channel being disposed between the perforated inner diameter wall of the tubular filter portion and the cylindrical filter portion;
    a second channel fluidly coupled between the perforated outer diameter wall of the tubular filter portion and the outlet of the housing, the second channel being disposed between the perforated outer diameter wall of the tubular filter portion and the housing;
    a first filter bag disposed within the cylindrical filter portion, wherein the first filter media is disposed within the first filter bag; and,
    a second filter bag disposed within the tubular filter portion, wherein the second filter media is disposed within the second filter bag.

11. The device of claim 10 wherein the filter member includes a second cover arranged adjacent the first cover, the second cover having a plurality of slots in fluid communication with the second channel.

12. The device of claim 11 further comprising an inlet chamber disposed between the filter member and the inlet of the housing, and a chamber disposed between the first cover and the second cover.

13. The device of claim 6 wherein the filter member is removably coupled to the housing.

14. A contaminate control device comprising:
    a pressure vessel having a closed first end and an open second end, the first end having a wall having an inlet and a first chamber, the pressure vessel having an axis;
    a first cover removably and sealably coupled to the second end, the first cover having an outlet, the pressure vessel and the first cover cooperating to define an interior volume;
    a member disposed coaxially and removably coupled within the interior volume, the member comprising:
       an axial flow filter having a housing and a perforated inlet end and a perforated outlet end, the axial flow filter having a catalyst disposed therein, wherein the perforated inlet end is fluidly coupled to the first chamber and the perforated outlet end is fluidly coupled to the outlet, the axial flow filter configured to flow a first gas portion through a first filter media parallel to the axis directly between the perforated inlet end and the perforated outlet end;
       a flow restrictor disposed in the housing between the perforated inlet end of the axial flow filter and the first chamber;
       a radial flow filter having an inner diameter having an inlet and an outer diameter having an inlet, the radial flow filter being circumferentially disposed at least partially around the axial flow filter, wherein the radial flow filter is configured to flow a second gas portion through a second filter media in a radial direction relative to the axis directly between the inner diameter and the outer diameter while the first gas portion is flowing through the axial flow filter;
       a first channel defined by the housing of the axial flow filter and the inner diameter of the radial flow filter, the first channel being fluidly coupled to the inlet of the pressure vessel; and, a second channel defined by the pressure vessel and the outer diameter of the radial flow filter, the second channel being fluidly coupled to the outlet of the first cover;

wherein the flow restrictor is sized to provide a first pressure drop between the flow restrictor and the perforated outlet of the axial flow filter that is substantially equal to a second pressure drop between the inlet of the radial flow filter and the outlet of the radial flow filter for a predetermined flow rate through the axial flow filter and the radial flow filter.

15. The device of claim 14 wherein the flow restrictor includes at least one felt disk.

16. The device of claim 15 wherein the first filter media includes a charcoal material disposed adjacent the catalyst.

17. The device of claim 16 wherein the member further includes a second cover disposed on an end adjacent the first cover, the second cover having a plurality of slots fluidly coupled to the second channel.

18. The device of claim 17 wherein the first cover and the second cover define a second chamber, the second chamber being fluidly coupled between the outlet of the first cover and the perforated outlet end of the axial flow filter and the second channel.

19. The device of claim 18 wherein the radial flow filter inner diameter includes a first plurality of holes and the filter outer diameter includes a second plurality of holes.

* * * * *